United States Patent
Grahl

(10) Patent No.: US 8,961,653 B2
(45) Date of Patent: Feb. 24, 2015

(54) METHOD AND DEVICE FOR VACUUM PRESSURE SWING ADSORPTION WITH TEMPORARY STORAGE

(75) Inventor: Matthias Grahl, Munich (DE)

(73) Assignee: Linde Aktiengesellschaft, Munich (DE)

(*) Notice: Subject to any disclaimer, the term of this patent is extended or adjusted under 35 U.S.C. 154(b) by 130 days.

(21) Appl. No.: 13/879,033

(22) PCT Filed: Oct. 5, 2011

(86) PCT No.: PCT/EP2011/004969
§ 371 (c)(1),
(2), (4) Date: Apr. 25, 2013

(87) PCT Pub. No.: WO2012/048814
PCT Pub. Date: Apr. 19, 2012

(65) Prior Publication Data
US 2013/0206004 A1    Aug. 15, 2013

(30) Foreign Application Priority Data
Oct. 16, 2010 (DE) .......... 10 2010 048 774

(51) Int. Cl.
*B01D 53/047* (2006.01)
*B01D 53/053* (2006.01)
*C01B 13/02* (2006.01)

(52) U.S. Cl.
CPC .......... *B01D 53/0476* (2013.01); *B01D 53/053* (2013.01); *C01B 13/0259* (2013.01); *B01D 2256/12* (2013.01); *B01D 2259/402* (2013.01); *B01D 2259/4533* (2013.01)
USPC ................................. 95/96; 96/130

(58) Field of Classification Search
CPC ............... B01D 53/047; B01D 53/053; B01D 2256/12; B01D 2259/402; B01D 2259/4533; C01B 13/0259
USPC ........ 95/96, 101, 102, 130, 148; 96/121, 130, 96/143; 128/204.18, 205.27
See application file for complete search history.

(56) References Cited

U.S. PATENT DOCUMENTS 5,370,728 A * 12/1994 LaSala et al. ................... 95/101
5,415,683 A   5/1995 Leavitt
(Continued)

FOREIGN PATENT DOCUMENTS

| EP | 0654439 A1 | 5/1995 |
| EP | 1078674 A2 | 2/2001 |
| WO | 2004052495 A1 | 6/2004 |

OTHER PUBLICATIONS

International Search Report from PCT/EP2011/004969 dated Jan. 17, 2012.

*Primary Examiner* — Frank Lawrence
(74) *Attorney, Agent, or Firm* — Millen, White, Zelano & Branigan, P.C.

(57) ABSTRACT

Adsorptive decomposition of a gas mixture is performed by vacuum pressure swing adsorption. The gas mixture is condensed to the adsorption pressure by means of at least one condenser prior to being fed into the vacuum pressure swing adsorption process. Regeneration of the adsorber(s) is carried out by means of at least one vacuum pump. The condensed gas mixture (1, 5, 6) is at least periodically and/or at least partially temporarily stored (S1) and/or fed to a consumer at those times when no gas mixture is being fed to the vacuum pressure swing adsorption process; and/or at least one of the vacuum pumps (P) that is not required for the regeneration is used at least occasionally for another application at those times when no regeneration of the adsorber or an adsorber (A, A') is being carried out.

20 Claims, 1 Drawing Sheet

(56) References Cited

U.S. PATENT DOCUMENTS

| | | |
|---|---|---|
| 5,997,612 A | 12/1999 | Doong |
| 6,245,127 B1 | 6/2001 | Kane et al. |
| 6,962,654 B2 | 11/2005 | Arnaud |
| 2003/0173276 A1 | 9/2003 | Arnaud |
| 2006/0137522 A1* | 6/2006 | Nishimura et al. ............... 95/96 |

* cited by examiner

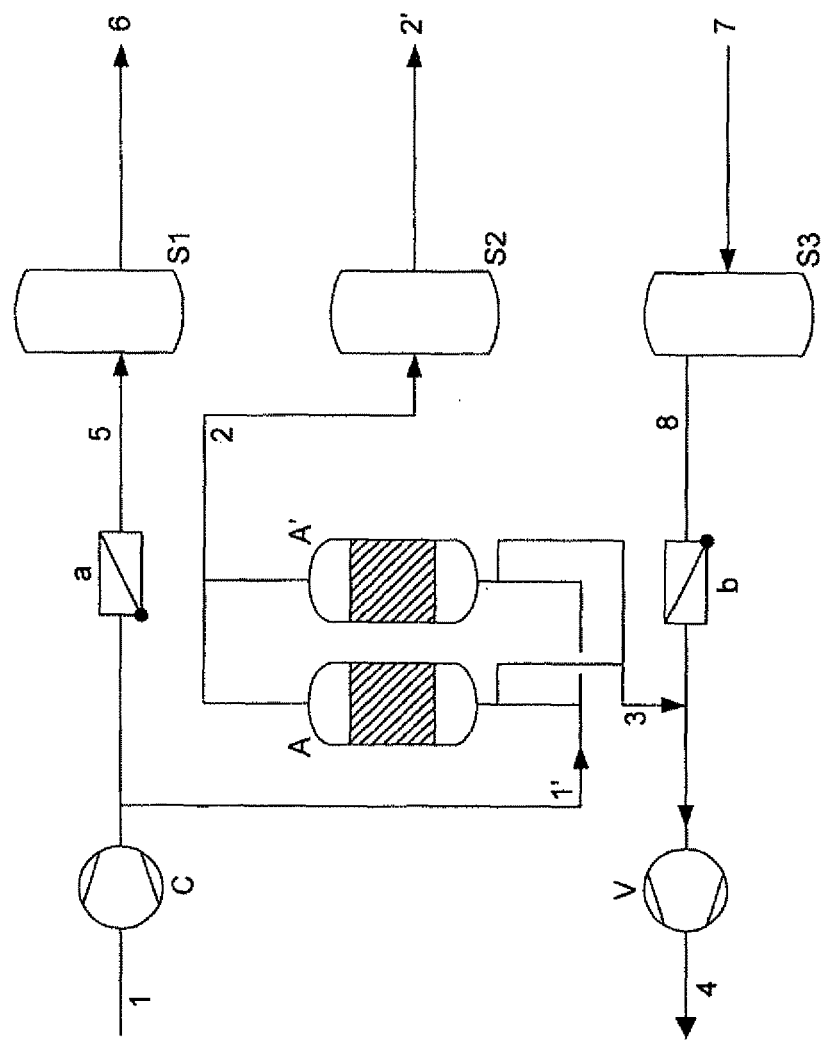

METHOD AND DEVICE FOR VACUUM PRESSURE SWING ADSORPTION WITH TEMPORARY STORAGE

The invention relates to a method for the adsorptive decomposition of a gas mixture by means of a vacuum pressure swing adsorption process, the gas mixture to be decomposed being compressed to the adsorption pressure by means of at least one compressor before being delivered to the vacuum pressure swing adsorption process, and the regeneration of the adsorber or adsorbers taking place by means of at least one vacuum pump.

The invention relates, furthermore, to a device for carrying out a method for the adsorptive decomposition of a gas mixture by means of a vacuum pressure swing adsorption process, having at least one compressor, at least one adsorber and at least one vacuum pump.

Vacuum pressure swing adsorption processes or VPSA processes are sufficiently known from the prior art. They differ from pressure swing adsorption processes or PSA processes in that the regeneration of a laden adsorber takes place under subatmospheric pressure. In order to achieve this, the adsorbers to be regenerated are regenenerated by means of a vacuum pump. The desorption pressure usually lies between 100 and 500 mbara. Adsorption mostly takes place under overpressure. For this reason, as a rule, a compressor is provided, which compresses the gas mixture to be decomposed to the desired adsorption pressure before being delivered to the vacuum pressure swing adsorption process.

The advantages of vacuum pressure swing adsorption processes over conventional pressure swing adsorption processes are to be seen in that higher yields and a lower energy demand are achieved. However, these advantages are afforded at the expense of the provision of a vacuum pump, thus resulting in an increase in the investment costs of VPSA processes, as compared with PSA processes, particularly in small-scale plants.

During a vacuum pressure swing adsorption process, there are conventionally method steps, such as a pressure compensation or dump step, in which the compressor and/or the vacuum pump are/is not required. During these method steps, however, the compressor and/or vacuum pump continues to be operated in bypass mode, since switch-off is practically impossible on account of the brevity of the method steps.

VPSA processes have long been used in what are known as on-site plants for the generation of oxygen and have a very favorable energy demand. In small-scale plants, which are to be understood as meaning plants with a capacity of less than 100 Nm3/h, such as would be required, for example, for the supply of hospitals, VPSA processes have hitherto been unable to gain acceptance because of the higher investment costs resulting from the additionally required vacuum pump and from an increased adsorbent demand. The term "hospital" is to be understood below as also meaning mobile (emergency) hospitals, ambulances, doctors' surgeries, wellness centers, etc.

The infrastructure of a modern hospital comprises, inter alia, supplying patients with what is known as "medical air", with oxygen-enriched air and with pure oxygen. The term "medical air" is conventionally understood to mean a gas mixture which has approximately 20% oxygen and approximately 80% nitrogen and, as regards other components, such as, for example, water and carbon monoxide, fulfils corresponding specifications and/or regulations. Furthermore, the infrastructure of a hospital usually comprises a compressed-air system and a vacuum system. The last-mentioned is a system which, by means of vacuum pumps and buffer tanks in a pipeline system, maintains a vacuum which is available in the hospital for all suction applications, for example in operating theaters. Three different plants not connected to one another have usually been used hitherto for the provision of oxygen, compressed air and vacuum.

The object of the present invention is to specify a generic method and a generic device for the adsorptive decomposition of a gas mixture by means of a vacuum pressure swing adsorption process, which method and which device avoid the abovementioned disadvantages and, in particular, are beneficial for use in hospitals.

To achieve this object, a generic method is proposed which is characterized in that
- at those times at which no gas mixture is delivered to the vacuum pressure swing adsorption process, the compressed gas mixture is at least temporarily and/or at least partially intermediately stored and/or delivered to a consumer, and/or
- at those times at which no regeneration of the adsorber or to an adsorber by means of the vacuum pump or at least one of the vacuum pumps takes place, the vacuum pump or at least one of the vacuum pumps not required for regeneration is employed at least temporarily for another intended use.

The device according to the invention is characterized in that
- at least one first storage tank is provided and this is connected to the compressor or to at least one of the compressors in such a way that, at those times at which no gas mixture is delivered to the vacuum pressure swing adsorption process, the compressed gas mixture is routed at least temporarily and/or at least partially into the first storage tank or at least one of the first storage tanks, and/or
- at least one second storage tank is provided and this is connected to the vacuum pump or to at least one of the vacuum pumps in such a way that, at those times at which no regeneration of the adsorber or of an adsorber by means of the vacuum pump or at least one of the vacuum pumps takes place, the vacuum pump or at least of the vacuum pumps not required for regeneration evacuates at least temporarily the second storage tank or at least one of the second storage tanks.

Further advantageous refinements of the method according to the invention and of the device according to the invention for the adsorptive decomposition of a gas mixture by means of a vacuum pressure swing adsorption process, which constitute the subjects of the dependent patent claims, are characterized in that
- the gas mixture to be decomposed adsorptively is air,
- the compression of the gas mixture to be decomposed adsorptively takes place by means of a single-stage or multistage compressor unit,
- the regeneration of the adsorber or adsorbers takes place by means of a single-stage or multistage vacuum pump unit,
- compressed gas mixture at least temporarily and/or at least partially intermediately stored is delivered to the adsorber or to an adsorber which is in the adsorption phase, delivery taking place preferably when an adjustable pressure value in the storage device used for intermediate storage is overshot, and
- in so far as the vacuum pump used for regenerating the adsorber or adsorbers is connected at least temporarily to a storage tank to be evacuated, the storage tank to be evacuated is connected at least temporarily to the adsorber or to an adsorber which is in the desorption phase, this connection preferably taking place when an adjustable pressure value in the storage tank is undershot.

BRIEF DESCRIPTION OF THE FIGURE

FIG. 1 illustrates an embodiment of the invention.

The method according to the invention, the device according to the invention and further advantageous refinements of said method and of said device will be explained in more detail below by means of the exemplary embodiment illustrated in the FIGURE.

Two adsorbers A and A' which are arranged parallel to one another and run offset in time through adsorption and desorption phases are illustrated. The method according to the invention can also be implemented, in principle, with only one or with more than two adsorbers. For the sake of clarity, the adsorber valves which directly preceed and follow the adsorbers and the functions of which are familiar to a person skilled in the art are not illustrated in the FIGURE. Furthermore, the VPSA plant according to the invention has a compressor unit C, a vacuum pump unit V, three storage tanks S1 to S3 and valves or nonreturn flaps a and b.

The procedure according to the invention will be explained below by the adsorptive decomposition of air so as to obtain an oxygen-rich product stream. Air is delivered via line 1 to a compressor unit C of single-stage or multistage design and is compressed in this to the desired adsorption pressure. The compressed air stream is subsequently delivered via the line 1' to that of the two adsorbers A and A' which is in the adsorption phase.

An oxygen-rich product stream is drawn off via line 2 at the head of the adsorber A or A' which is in the adsorption phase and, if appropriate, is intermediately stored S2. The oxygen-rich product stream can be extracted from the storage tank S2 via line 2' and delivered for further use.

If an adsorber laden in the adsorption phase is regenerated, it is connected via line 3 to the vacuum pump unit V. By means of this, regeneration of the laden adsorber to any desired subatmospheric desorption pressure is carried out. The gas mixture drawn off during regeneration from the adsorber to be regenerated is discharged via the line 4 and, if appropriate, delivered for further use.

During those method steps of the VPSA process in which no batch gas mixture is delivered to an adsorber, according to the invention the compressor unit C is connected via the line 5 to the first storage tank or compressed-air buffer S1. The line 5 has provided in it a non-return flap a which opens when a specific pressure is reached and consequently releases access into the compressed-air buffer S1. The pressure required for opening the non-return flap a is achieved in that the adsorber valves preceding the adsorbers A and A' are closed. Extraction of the compressed air stream from the compressed-air buffer S1 takes place via the line 6. Alternatively or additionally to intermediate storage, the air stream compressed by means of the compressor C may also be delivered directly to a (compressed-air) consumer.

In so far as the connection between an adsorber and vacuum pump unit V is broken as a result of the closing of the corresponding adsorber valves, the non-return flap b provided in the line 8 opens, so that evacuation of the third storage tank or vacuum buffer S3 takes place via the lines 4 and 8 by means of the vacuum pump unit V. The "filling" of the tank S3 takes place via the line 7.

The pressure in the first storage tank or compressed-air buffer S1 preferably lies above the maximum adsorption pressure, while the pressure in the third storage tank or vacuum buffer S3 lies below the minimum desorption pressure.

Instead of the non-return flaps a and b illustrated in the FIGURE, any alternative mechanism may be used which in a suitable and/or desired period of time makes a connection between the first storage tank or compressed-air buffer S1 and the compressor C and also between the third storage tank or vacuum buffer S3 and the vacuum pump V. Mention may be made merely by way of example of switching valves which are activated by the control of the VPSA process or via differential pressure measurement.

A further advantageous refinement of the method according to the invention is characterized in that compressed gas mixture at least temporarily and/or at least partially intermediately stored is delivered to the adsorber or to an adsorber which is in the adsorption phase, delivery taking place preferably when an adjustable pressure value in the storage tank S1 used for intermediate storage is overshot. In the event of too low a take-off of compressed air, the pressure in the compressed-air buffer S1 rises. When a specific pressure value, for example 8 bar, is overshot, the compressed air is then delivered at a suitable time point from the compressed-air buffer S1 to an adsorber A or A' which is in the adsorption phase. The capacity of the VPSA process is thereby increased, since more inlet gas is available. Furthermore, a needlessly high energy consumption of the compressor and/or the reaching of an inadmissibly high pressure in the compressed-air buffer S1 can be prevented.

In so far as the vacuum pump used for regenerating the adsorber or adsorbers is connected at least temporarily to a storage tank to be evacuated, according to a further advantageous refinement of the method according to the invention the storage tank to be evacuated is connected at least temporarily to the adsorber or to an adsorber which is in the desorption phase, this connection preferably taking place when an adjustable pressure value in the storage tank is undershot. In the event of too low a vacuum demand, the pressure in the vacuum buffer S3 falls. When a specific pressure, for example 200 mbara, is undershot, the vacuum buffer S3 can be connected at a suitable time point directly, bypassing the non-return flap b or an equivalent device, to the regenerating gas side of an adsorber which is in the desorption phase. The capacity of the VPSA process consequently rises, since regeneration takes place more effectively. Moreover, a needlessly high energy consumption of the vacuum pump and/or the undershooting of an inadmissibly low pressure in the vacuum buffer S3 can be prevented.

By means of the method according to the invention, for example, oxygen with a purity of 93% can be generated in the case of a power of 25 Nm3/h; at the same time, 30 Nm3/h of compressed air can be generated and a vacuum suction power of 26 m3/h can be provided.

By means of the procedure according to the invention, compressors and a vacuum pump or vacuum pumps which are required for the VPSA process can be used additionally for the generation of compressed air and vacuum. For this purpose, the necessarily occurring idling times of this machine are utilized. The compressors and vacuum pump or vacuum pumps are thereby utilized more effectively and, as compared with the prior art, those separate machines which would otherwise have to be provided for the generation of compressed air and vacuum are dispensed with.

As already mentioned, the compressors and vacuum pump or vacuum pumps, in so far as they are not required during specific method steps, have hitherto run in the bypass mode. However, this operating mode necessitates additional pipework with lines and bypass flaps which can in this case be dispensed with.

By suitable dimensioning of the machines and of the adsorbers, the method according to the invention and the plant according to the invention can be adapted to the respective demand for product or oxygen, compressed air and/or vacuum. Moreover, the method according to the invention can be employed, in times of low product or oxygen take-off, to an increased extent for the generation of compressed air and/or vacuum. In this case, the process steps or method steps of the VPSA process are preferably prolonged correspondingly.

The method according to the invention and the device according to the invention for the adsorptive decomposition of a gas mixture by means of a vacuum pressure swing adsorption process are suitable especially for use in hospitals, since they make it possible to provide oxygen, compressed air and vacuum by means of a single process or a single plant. Basically, however, the invention may be employed in any production workshops and (large-scale) plants.

The invention claimed is:

1. A method for the adsorptive decomposition of a gas mixture by means of a vacuum pressure swing adsorption process, wherein a gas mixture to be decomposed adsorptively is compressed to the adsorption pressure by means of at least one compressor before being delivered to the vacuum pressure swing adsorption process, and the regeneration of adsorber or adsorbers utilized in said vacuum pressure swing adsorption process occurs by means of at least one vacuum pump, and wherein
at those times at which no gas mixture is delivered to the vacuum pressure swing adsorption process, the compressed gas mixture (1, 5, 6) is at least temporarily and/or at least partially intermediately stored (S1) and/or delivered to a consumer, and/or
at those times at which no regeneration of the adsorber (A, A') or of an adsorber (A, A') by means of the vacuum pump (V) or at least one of the vacuum pumps (V) takes place, the vacuum pump (P) or at least one of the vacuum pumps (P) not required for regeneration is employed at least temporarily for another intended use.

2. The method as claimed in claim 1, wherein said gas mixture to be decomposed adsorptively is air.

3. The method as claimed in claim 1, wherein compression of said gas mixture to be decomposed adsorptively takes place by means of a single-stage compressor unit (C).

4. The method as claimed in claim 1, wherein regeneration of the adsorber or adsorbers (A, A') takes place by means of a single-stage vacuum pump unit (V).

5. The method as claimed in claim 1, wherein said compressed gas mixture (S1) at least temporarily and/or at least partially intermediately stored is delivered to the adsorber (A, A') or to an adsorber (A, A') which is in the adsorption phase.

6. The method as claimed in claim 1, wherein the vacuum pump (V) used for regenerating the adsorber or adsorbers (A, A') is connected at least temporarily to a storage tank (S3) to be evacuated, and the storage tank (S3) to be evacuated is connected at least temporarily to the adsorber (A, A') or to an adsorber (A, A') which is in the desorption phase.

7. A device for carrying out a method according to claim 1, said device comprising:
at least one compressor, at least one adsorber and at least one vacuum pump, wherein
at least one first storage tank (S1) is provided and is connected to the compressor or to at least one of the compressors (C) in such a way that, at those times at which no gas mixture is delivered to the vacuum pressure swing adsorption process, the compressed gas mixture (1, 5, 6) is routed at least temporarily and/or at least partially into the first storage tank (S1) or at least one of the first storage tanks (S1), and/or
at least one second storage tank (S3) is provided and this is connected to the vacuum pump or to at least one of the vacuum pumps (V) in such a way that, at those times at which no regeneration of the adsorber (A, A') or of an adsorber (A, A') by means of the or at least one of the vacuum pumps (V) takes place, the vacuum pump (P) or at least one of the vacuum pumps (P) not required for regeneration evacuates at least temporarily the second storage tank (S3) or at least one of the second storage tanks (S3).

8. The device as claimed in claim 7, wherein the compressor or compressors (C) are of a single-stage design.

9. The method as claimed in claim 1, wherein at those times at which no gas mixture is delivered to the vacuum pressure swing adsorption process, the compressed gas mixture (1, 5, 6) is at least temporarily and/or at least partially intermediately stored (S1) and/or delivered to a consumer.

10. The method as claimed in claim 1, wherein at those times at which no regeneration of the adsorber (A, A') or of an adsorber (A, A') by means of the vacuum pump (V) or at least one of the vacuum pumps (V) takes place, the vacuum pump (P) or at least one of the vacuum pumps (P) not required for regeneration is employed at least temporarily for another intended use.

11. The method as claimed in claim 9, wherein at those times at which no regeneration of the adsorber (A, A') or of an adsorber (A, A') by means of the vacuum pump (V) or at least one of the vacuum pumps (V) takes place, the vacuum pump (P) or at least one of the vacuum pumps (P) not required for regeneration is employed at least temporarily for another intended use.

12. The method as claimed in claim 9, wherein at those times at which no gas mixture is delivered to the vacuum pressure swing adsorption process, the compressed gas mixture (1, 5, 6) is at least temporarily stored (S1).

13. The method as claimed in claim 9, wherein at those times at which no gas mixture is delivered to the vacuum pressure swing adsorption process, the compressed gas mixture (1, 5, 6) is at least temporarily delivered to a consumer.

14. The method as claimed in claim 1, wherein compression of said gas mixture to be decomposed adsorptively takes place by means of a multistage compressor unit (C).

15. The method as claimed in claim 1, wherein regeneration of the adsorber or adsorbers (A, A') takes place by means of a multistage vacuum pump unit (V).

16. The method as claimed in claim 1, wherein said compressed gas mixture (S1) at least temporarily and/or at least partially intermediately stored is delivered to the adsorber (A, A') or to an adsorber (A, A') which is in the adsorption phase, delivery taking place when an adjustable pressure value in the storage device (S1) used for intermediate storage is overshot.

17. The method as claimed in claim 1, wherein the vacuum pump (V) used for regenerating the adsorber or adsorbers (A, A') is connected at least temporarily to a storage tank (S3) to be evacuated, and the storage tank (S3) to be evacuated is connected at least temporarily to the adsorber (A, A') or to an adsorber (A, A') which is in the desorption phase, this connection taking place when an adjustable pressure value in the storage tank (S3) is undershot.

18. The device as claimed in claim 7, wherein the compressor or compressors (C) are of a multistage design.

19. The device as claimed in claim 7, wherein the vacuum pumps (V) are of a single-stage design.

20. The device as claimed in claim 7, wherein the vacuum pumps (V) are of a multistage design.

* * * * *